UNITED STATES PATENT OFFICE.

CONRAD WIEGAND, OF VIRGINIA CITY, NEVADA.

IMPROVEMENT IN PROCESSES OF SEPARATING SILVER FROM OTHER METALS.

Specification forming part of Letters Patent No. 145,265, dated December 2, 1873; application filed August 1, 1873.

*To all whom it may concern:*

Be it known that I, CONRAD WIEGAND, of Virginia City, Storey county, State of Nevada, have invented an improved and economical method for the more or less complete separation of silver from gold or from copper, or from other base metals whose amalgams possess a crystallization or grain and also a mercurial solubility similar to that of copper, and which base metals, for the purpose of this description, I term "copper-base" metals.

Though this same method of refining silver may be applied to the separation of silver from lead and from other base metals whose amalgams possess a crystallization or grain and also a mercurial solubility similar to lead, (and in this description, therefore, called "lead-base,") yet, as I have invented what I deem a better process for that purpose, and, as I am informed, a process has been in use for the separation of silver and lead, which, though inferior in form to that herein described, nevertheless in some respects resembles it, I hereby disclaim all wish to apply this method or invention to the separation of silver from lead.

The following is a directive description of a process by which my invention may be applied to the purpose for which I claim it to be adapted, and is sufficient to enable others skilled in the art to understand the same.

The mixed metals to be separated, if not already in the form of an amalgam, are to be homogeneously amalgamated to a soft paste or fluid mass. This may be done by grinding in a bath of quicksilver or otherwise, the method of amalgamation not being material. Though so doing is not essential to the successful working of the process, it is recommended that the paste-like or fluid amalgam be thoroughly cleansed from iron and from all substances not readily soluble in mercury. This may be effected either by washing or by grinding the amalgam, diluted with mercury, in a bath of water, warm or cold, or it may be sufficiently effected by dilution with mercury and subsequently straining the mass through fine iron or steel screens; but, cleansed in any other way, it would equally add to the neatness of the subsequent operations of the process. The already-diluted amalgam is to be next dissolved, in an excess of pure or clean mercury, to a state of quick fluidity. In this state, preferably to that of any other, it is to be put (and subsequently fed from time to time) into an upright vessel of wood or of earthenware, or, yet better, of iron. In or to the bottom of this vessel a strainer — say, a very fine screen, a close-grained straining-cloth, or a porous filter—is to be secured. For the purpose of this description, this vessel with its strainer will be called the upper separator, and should be provided, among other appurtenances, with a plug-vent near the bottom, but above the strainer, through which unstrained amalgam may be drawn off, when desired, without removing the strainer. It should also be furnished with a close-fitting lid, to which should be attached a plug-closed funnel for feeding in amalgam, and a revolving shaft for stirring the amalgam, and an iron condensing-tube. A tube should also be inserted near the top of the vessel for the introduction of clean mercury, by means of a pump or otherwise. Heat should next be applied to the diluted amalgam, while additional unfouled mercury is screened through the upper separator. While this filtration is being carried on, a sufficient agitation of the straining amalgam should be maintained to prevent choking the strainer. The heat to be applied need not be as great as that of boiling water; and, on the other hand, it may be raised to a higher temperature than that of boiling water. Neither the degree of heat to be applied nor the method of its application constitutes an essential part of my invention. The application of a higher heat than that of the common temperature of the air alone is such an essential part.

A convenient method of applying heat, varying in degree, is that of adjusting iron pipes within the upper separator in such a way that hot air or steam, or heated water, oil, or other fluids may be caused to circulate in them; or, if the upper separator is made of earthenware or iron, it may be simply submerged or surrounded by water whose temperature can readily be regulated; or, if the upper separator is made of iron, it may be surrounded by an iron jacket, leaving an intervening space, constituting a furnace; but in all cases, alike as a device for preserving the health of operatives and for economy, any fumes of mercury which may be originated should be condensed, by keeping the condensing-tube cold.

The mercury which strains through from the upper separator will be found to have carried with it a larger proportion of silver than of gold or copper base metals, to recover which it is only necessary that it be cooled and strained again. To avoid loss of fine particles of quicksilver or amalgam, which will occur if cooled by direct contact with running cold water, it is best to discharge the filtrate of the upper separator into cold closed iron tubes or vessels, from which it should pass to one of a pair of lower separators, so adjusted to the cooling-tubes that either of the lower separators may be removed and the contents collected while the other is in operation. From below the strainer of the lower separators the cold-strained mercury should be pumped or otherwise carried back to the top of the upper separator. When lead or lead-base metals are absent, the results of the second or cold filtration will be, first, within the lower separator, an amalgam containing a comparatively small proportion of gold or base metals; second, below the strainer, and having passed through it, mercury sufficiently pure or clean to be used again for filtration.

The refined amalgam, hereinbefore specified as the first product of cold filtration, by similar repeated alternately warm and cold filtrations and strainings will become yet further refined from base metals. By mixing it anew with copper amalgam free from gold, the silver will strain almost free from gold, nearly the whole of which will be retained in the upper separator.

When sufficiently free from gold and copper base metals for the purpose of the operator, the refined amalgam may be reduced to the form of crude bullion by retorting in the ordinary way.

The amalgam which remains in the upper separator after careful filtration will contain nearly all of the gold and copper base metals which were originally associated with the silver, and a small proportion of silver besides. This silver may be separated by roasting the retorted amalgam with access of air, so that it may be pulverized and sifted, care having been taken, in retorting, to raise the temperature to a point sufficient to almost melt the silver, but not the spongy copper. The silver will be found to have formed itself into a thin shell against the sides and bottom of the retort, (or retort-cups,) or, with small flakes, threads, granules, and globules throughout the mass. The gold and copper are not wasted or lost; but, as the separation of gold from base metals whose oxides are soluble in dilute sulphuric acid is the subject of another process, a description of it here would be out of place.

Having thus described a process by which my invention may be made useful, pointing out therein the essential features of the invention itself, as well as certain accessories, what I claim, and desire to secure by Letters Patent, is—

1. The process herein described for separating or refining silver, through a more or less complete separation of its amalgam from the amalgams of other metals, by leaching them with quicksilver, while warm or hot, in or upon a strainer, and subsequently straining the filtrate cold.

2. The process of heating, straining, and cooling the amalgams herein described, without allowing either the amalgam or quicksilver to come in contact with water or other cooling liquids or mixtures, substantially as and for the purpose set forth.

In witness whereof I hereunto set my hand and seal.

CONRAD WIEGAND. [L. S.]

In presence of—
L. SIEBENHAUER,
WILL. H. BURRALL.